Feb. 16, 1937.  A. SMITH  2,070,959
KNIFE FOR SUGARCANE MILLS OR THE LIKE
Filed Feb. 20, 1935  3 Sheets-Sheet 2
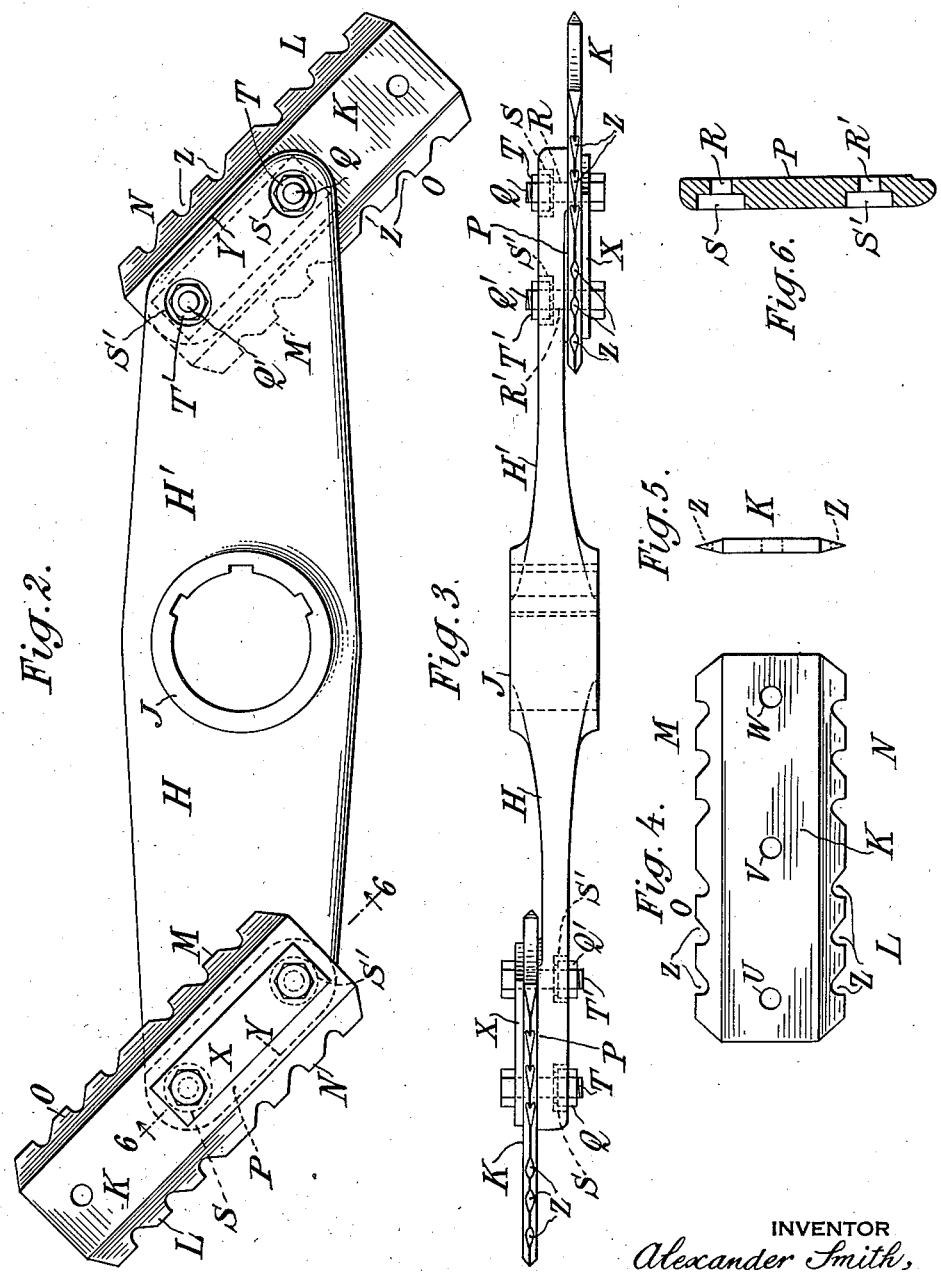
INVENTOR
Alexander Smith,
BY
ATTORNEYS Feb. 16, 1937. A. SMITH 2,070,959
KNIFE FOR SUGARCANE MILLS OR THE LIKE
Filed Feb. 20, 1935 3 Sheets-Sheet 3

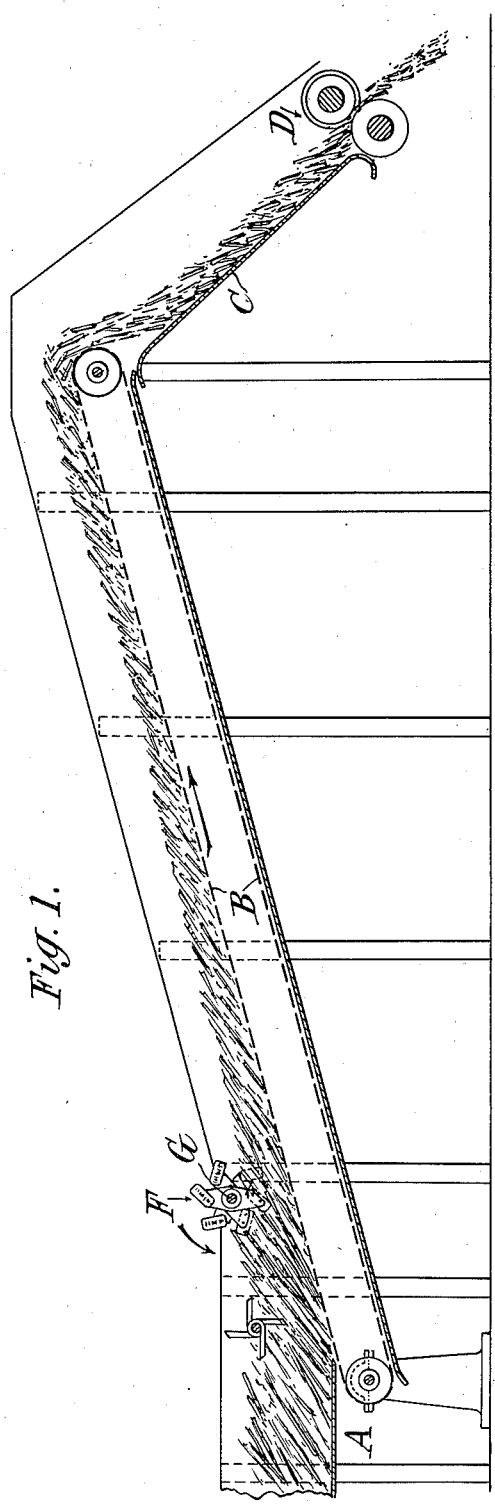

INVENTOR
Alexander Smith,
BY
ATTORNEYS.

Patented Feb. 16, 1937

2,070,959

UNITED STATES PATENT OFFICE 2,070,959

KNIFE FOR SUGAR CANE MILLS OR THE LIKE

Alexander Smith, Ansonia, Conn., assignor to Farrel-Birmingham Company, Incorporated, Ansonia, Conn., a corporation of Connecticut Application February 20, 1935, Serial No. 7,312

5 Claims. (Cl. 146—121)

This invention relates to sugar cane mills, and is particularly directed to a cutter mechanism which is employed to cut the cane into short pieces before it is fed to the crushing machines.

In the common form of sugar cane mill the stalks of cane, ranging from five to ten feet in length, are dumped indiscriminately upon a movable carrier,—usually in some form of an endless belt,—which elevates them slightly to a point where they are permitted to be fed by gravity into the crushing machinery. At some point in the travel of the cane it has been found to be very desirable to cut the long stalks into short pieces and to split open, wholly or partly, the pieces so cut. This is commonly effected by a rotary cutter arranged at some convenient point in advance of the crushing machines. This rotary cutter comprises essentially a shaft having a multiplicity of cutting knives arranged along the shaft a short distance apart in a somewhat staggered order so that some of the knives are continuously acting upon the stream of stalks as it passes alongside of or beneath the cutter. The knives have heretofore been arranged on separately formed hubs extended along the shaft, each hub bearing two knives.

The principal object of the present invention is to improve the form of knife used for this purpose, to greatly increase its useful periods between sharpening and to simplify and cheapen the knives and hence the entire cutter.

The invention includes other features of construction which will be hereinafter more fully described.

Referring to the drawings, which illustrate one form of the invention—

Figure 1 is a more or less diagrammatic view of the fore part of a sugar mill showing a part of the elevating conveyor, the feed chute, and a portion of one of the crushing devices;

Fig. 2 is an elevation of one of the cutter arms showing the improved knife structure applied to each end thereof;

Fig. 3 is an edge view of Fig. 2 showing the appearance of the cutter arms and knives in plan;

Fig. 4 is a view of one of the knives detached;

Fig. 5 is an end view of Fig. 4;

Fig. 6 is a section on the line 6—6 in Fig. 2;

Figure 7:
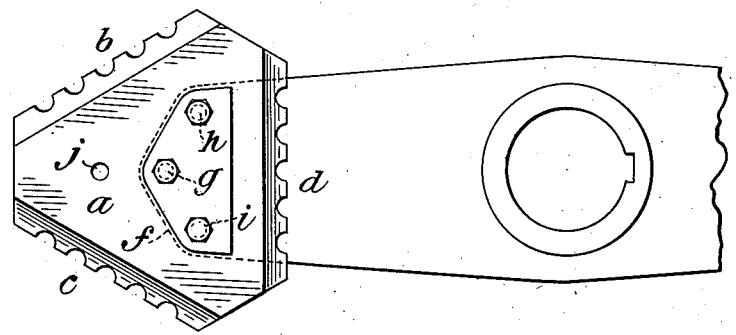
Fig. 7 is an elevation of a modified form of knife and a part of the cutter arm for supporting it.

In the preferred form of the invention shown in the drawings let A indicate a suitable loading platform designed to receive the cane in usually full-length stalks from the plantation. These are fed on an elevating carrier B, usually in the form of an endless belt of any suitable type, which conveys the cane to an inclined chute or slide C down which the cane is fed to the crusher D. There may be one or more crushers D, the output of which is then passed through suitable squeezing rolls by means of which the sugar cane juice is expressed and collected in the form of liquid. The mechanism starting with the squeezing rolls and the usually denominated "mill" forms no part of the present invention.

At some point in the travel of the cane from the platform A to the crusher the cutter F is arranged in a position to act upon the cane flowing past it. In the illustration given in the drawings the cutter F is arranged near the lower part of the conveyor B, but its point of arrangement is a matter of discretion and may be at any portion of the conveyor or even beyond, if desired. The function of the cutter, as before stated, is not only to cut the long stalks into comparatively short pieces, but also to break open such short pieces so that they may be more easily acted upon by the crusher.

The cutter usually comprises a rotating shaft G, which is driven at a suitable speed by any motor in the direction of the arrow in Fig. 1. The usual mounting for knives of this type is upon some form of cutter arm H, H', two such arms being carried upon a central hub J, as best seen in Fig. 3, the hubs being of sufficient axial length to form a proper spacing between the adjacent cutters when fitted closely together upon the shaft.

The form of knife provided by the present invention is best shown in Figs. 4 and 5, at K. In this form of the invention each individual knife has four cutting edges, as shown at L, M, N and O, so that with a single sharpening the knives may be used approximately four times as long as any form of knife now in common use. The knives are best made in general rectangular form, with a width which is slightly more than a third of its length, although these proportions may be varied. Each of the edges is preferably symmetrically beveled, as shown in Fig. 5. Means are provided for fastening the knives to the ends of the arms H, H' at an angle of approximately 45 degrees, as best seen in Fig. 2. For this purpose the ends of the arms are best faced off on opposite sides, as shown at P, P, to make flat supports for the knives; the actual fastening means being preferably in the form of bolts Q, Q', as best shown in Fig. 3. These bolts pass through holes R, R' in the cutter arms, which are provided with recesses S, S' designed to receive the nuts T, T'. The bolts Q, Q' pass through suitable holes U, V and W formed in the blade, the center hole V being employed in all positions of the blade and the end holes U and W being alternately used.

The two bolts Q, Q' are preferably welded to a side plate X (Fig. 3) so that the two bolts may be handled as a unit and also for the reason that the plate X constitutes an added clamp for the knife. In order to avoid too thick a structure the heads of the bolts Q, Q' may be reduced in thickness.

The ends of the arms H, H' are formed obliquely, as illustrated at Y, Y', in order that they may in general conform to the sides of the blades when the latter are in position.

By fastening the blades on opposite sides of the arms H, H', the knives are spaced apart a proper distance in a direction across the cutter and the spacing is such that when a group of cutter holders are fixed on the cutter shaft, the knives on adjacent holders are similarly spaced.

Assuming the blades are bolted in place, as shown in Fig. 2, it will be observed that the cutting edge L is first used, it being found in practice that the cutting edge N at the opposite end of the blade is practically idle during the cutting operation. When the edge L is dull, the blade may be swung around until the edge M is in operative position, and when this edge has become worn the blade is turned over side for side so as to bring the edge N into position. When this edge has been sufficiently used, the edge O is still available.

While the cutting edge may be of any form desired, I prefer that shown in which the various edges are serrated to form teeth Z, Z, which are preferably sharpened on the sides having the greater angle, the movement of the knife being such that such sharpened sides of the tooth principally contact with the case. When this form is used, the teeth at the two ends of the blade are so cut as to face in opposite directions with the sides of greater angle lying nearest the ends of the arms, so that when the blade is adjusted in any one of its positions, proper cutting action will be obtained. The effect of the teeth Z, Z is to open or split the cane, and this greatly facilitates the subsequent operations. The purpose of utilizing the side of the tooth which has a more obtuse extension rather than that which has the more acute extension, is to promote this splitting effect. It is permissible, however, to sharpen both sides of the tooth, since a certain amount of work may be done by the acute side.

In the operation of the device the cane stalks which are loaded upon the carrier B are naturally presented to the rotary cutter completely at random, and the cutter provided by the invention not only cuts the stalks and splits them open to a very considerable extent, but more or less lines them up and produces a fairly uniform flow of the cut lengths to the crusher.

Figure 8:
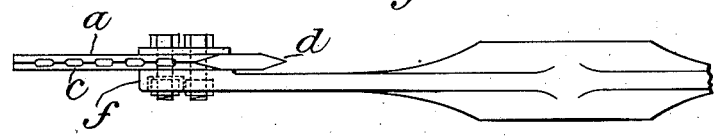
Fig. 8 is an edge view of Fig. 7.

While I have shown and described the preferred form of my invention, it will be understood that I do not wish to be limited thereto, since various changes may be made therein without departing from the spirit of the invention or the scope of the appended claims. For instance, in Figs. 7 and 8 I have shown a cutting blade $a$ in general polygonal form, in which there are three cutting edges $b$, $c$ and $d$, the three-sided blade being mounted symmetrically on the end of a cutter arm $f$. However, the conformation of the entire blade is such that the general extension of the cutting edge $c$, which is shown in operative position, is oblique to the center line of the cutting arm. In this construction the blade can well be provided with four holes $g$, $h$, $i$ and $j$, the center hole $g$ being used for fastening the blade in all positions, and two of the remaining holes being also utilized. The bolts may be similar to those heretofore described.

Figure 9:
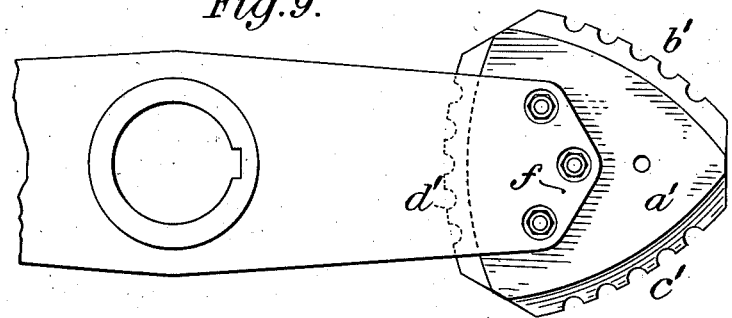
Fig. 9 is an elevation similar to Fig. 7 of another modification.
Figure 10:
Fig. 10 is an edge view of Fig. 9.

In Figs. 9 and 10 a similar construction of blade $a'$ is provided, except that the cutting edges $b'$, $c'$, $d'$ instead of being straight are slightly curved in form. Otherwise the construction and mode of fastening may be the same as in Figs. 7 and 8.

In both of these constructions each of the cutting edges $b$, $c$, $d$, (or $b'$, $c'$, $d'$) is of sufficient extension to form in reality two cutting edges, since, as before stated, it is the outer end of the blade which receives the most wear in use. Hence, the effective number of cutting edges in each of the devices shown in Figs. 7 to 10 may be said to be six, since each of the blades can be turned over side for side to bring into effect the opposite ends of each of the cutting edges. In this type of knife the outer edges of the teeth may be sharpened, and their sides wholly or partly blunt, in order to form teeth which are reversible in their action.

What I claim is:

1. A rotary cutter for sugar cane, having an arm adapted for connection to a shaft, and an elongated knife, with means for attaching the knife to the arm in any one of a plurality of similar oblique positions at the end of the arm, the knife having cutting edges on its opposite sides, either of which may be arranged in a cutting position, and oblique serrations toward each end of such cutting edges of the knife, the serrations toward each end of the knife being disposed to face the opposite end thereof.

2. A cutter for sugar cane, comprising a hub having oppositely arranged arms, a knife arranged at the end of each arm, and means for holding said knives in oblique positions, each of said knives having two cutting edges on each of two sides thereof, whereby each knife can be connected to its arm in four different effective positions and present four different cutting edges, and each of said edges having serrations, each serration being formed with portions of greater and less angularity and the serrations of the cutting edges on the same side being oppositely arranged, so that the portions of greater angularity lie nearer the ends of the blade.

3. A reversible blade for rotary sugar cane cutters or the like, comprising a leading portion extending substantially along a side thereof, said leading portion being adapted to obliquely approach material to be cut and having a plurality of cutting portions toward each end thereof and oblique serrations between said cutting portions, the serrations toward each end of the blade facing toward the opposite end thereof and the arrangement of the cutting portions and serrations toward opposite ends of the leading portion being substantially similar whereby to permit reversing of the blade without substantially modifying the manner of engagement thereof with the material being cut.

4. A reversible blade according to claim 3, having a trailing portion substantially similar to said leading portion, either of which portions may be selectively arranged to function as a leading portion.

5. A rotary cutter for sugar cane, comprising an arm adapted for connection to a shaft, an elongated cutting element and mounting means at one end of the arm and at the ends of said element for mounting the latter in any one of four outwardly-receding, oblique positions at one end of said arm, the cutting element having four cutting portions toward its ends, and each of the ends of the cutting element and the cutting portions thereon being adapted to substantially extend longitudinally beyond the end of the arm when the cutting element is connected to the arm by the mounting means at the other end of said cutting element, whereby when the said element is mounted in any one of said four positions, only one of the extending cutting portions is in position to cut the cane with the rotation of the arm and the cutting element may be mounted in turn, in the four said positions to fully utilize the four cutting portions without re-sharpening.

ALEXANDER SMITH.

CERTIFICATE OF CORRECTION.

Patent No. 2,070,959. February 16, 19:

ALEXANDER SMITH.

It is hereby certified that error appears in the printed specification of the above numbered patent requiring correction as follows: Page 2, first column, line 47, for the word "case" read cane; and that the said Letters Patent should be read with this correction therein that the same may confor to the record of the case in the Patent Office.

Signed and sealed this 23rd day of March, A. D. 1937.

(Seal)
Henry Van Arsdale
Acting Commissioner of Patents.